(12) United States Patent
Han et al.

(10) Patent No.: US 10,954,846 B2
(45) Date of Patent: Mar. 23, 2021

(54) ENGINE COOLING SYSTEM FOR VEHICLE

(71) Applicants: HYUNDAI MOTOR COMPANY, Seoul (KR); KIA MOTORS CORPORATION, Seoul (KR)

(72) Inventors: Jongwan Han, Suwon-si (KR); Danghee Park, Seoul (KR); Il Suk Yang, Hwaseong-si (KR); Yong Beom Park, Gunpo-si (KR); Soo Hyung Woo, Yongin-si (KR); Yong Woong Cha, Yongin-si (KR); Soo Young Kwak, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 182 days.

(21) Appl. No.: 16/212,059

(22) Filed: Dec. 6, 2018

(65) Prior Publication Data

US 2020/0116070 A1    Apr. 16, 2020

(30) Foreign Application Priority Data

Oct. 10, 2018    (KR) .................. 10-2018-0120179

(51) Int. Cl.
*F01P 7/14*    (2006.01)
*F01P 3/20*    (2006.01)
(Continued)

(52) U.S. Cl.
CPC ........ *F01P 7/14* (2013.01); *F01P 3/20* (2013.01); *F02M 26/28* (2016.02); *B60K 6/26* (2013.01);
(Continued)

(58) Field of Classification Search
CPC ..................... F01P 7/14; F01P 3/20
See application file for complete search history.

(56) References Cited

U.S. PATENT DOCUMENTS

2004/0050544 A1* 3/2004 Hohl .................. F01P 7/165
165/202
2016/0144691 A1* 5/2016 Youn .................. F01P 7/165
165/51
(Continued)

FOREIGN PATENT DOCUMENTS

KR    10-1655577    9/2016

*Primary Examiner* — Anne Marie Antonucci
*Assistant Examiner* — Abdalla A Khaled
(74) *Attorney, Agent, or Firm* — Morgan, Lewis & Bockius LLP

(57) ABSTRACT

An engine cooling system includes: an engine system including an engine having a plurality of combustion chambers that generate a driving force by combustion of fuel; a power electronics (PE) device that assists engine torque of the engine system in accordance with a driving state of the vehicle; a main radiator connected to the engine system by an engine coolant line and discharging heat generated in the engine system by engine coolant flowing in the engine coolant line, a sub-radiator connected to the PE device through a PE coolant line and discharging heat generated in the PE device by PE coolant flowing in the PE coolant line; a 2-way valve connecting the engine coolant line and the PE coolant line to each other; and a controller for controlling opening and closing of the 2-way valve according to a temperature of the engine coolant and a vehicle driving condition.

12 Claims, 7 Drawing Sheets

(51) Int. Cl.
*F02M 26/28* (2016.01)
*B60K 11/04* (2006.01)
*B60K 6/26* (2007.10)

(52) U.S. Cl.
CPC ......... *B60K 11/04* (2013.01); *B60K 2006/268* (2013.01); *B60Y 2200/92* (2013.01); *B60Y 2306/05* (2013.01); *F01P 2007/146* (2013.01); *F01P 2050/24* (2013.01); *F01P 2060/00* (2013.01)

(56) References Cited

U.S. PATENT DOCUMENTS

2018/0264913 A1* 9/2018 Enomoto ................ F01P 7/161
2020/0102880 A1* 4/2020 Loya .................. F02B 29/0443

* cited by examiner

ENGINE COOLING SYSTEM FOR VEHICLE

CROSS-REFERENCE TO RELATED APPLICATION

This application claims priority to and the benefit of Korean Patent Application No. 10-2018-0120179 filed in the Korean Intellectual Property Office on Oct. 10, 2018, the entire contents of which are incorporated herein by reference.

TECHNICAL FIELD

The present disclosure relates to an engine cooling system for a vehicle, more particularly, to an engine cooling system having a valve which allows coolant circulates through an engine cooling circuit and a power electronics cooling circuit in accordance with a driving condition.

BACKGROUND

A vehicle in general has an engine cooling system, which prevents an engine from overheating, and has a structure that releases the heat of the engine to outside the engine.

In order to remove the heat of the engine, the coolant circulates through an engine block and a cylinder head, and the heated coolant flows through a radiator disposed in front of the vehicle, and the radiator releases the heat of the coolant to the outside. This cooling system uses a variety of valves and constitutes an engine cooling circuit.

Such a cooling system is employed not only in a conventional internal combustion engine but also in a hybrid electric vehicle which uses engine power and battery power together. The hybrid electric vehicle uses an efficient combination of the engine power and the motor power. Hybrid electric vehicles can be classified into mild type and hard type depending on a power sharing ratio between the engine and the motor. The hybrid vehicle of the mild type is provided with a mild hybrid starter & generator (MHSG) that starts the engine instead of an alternator or is generated by the output of the engine.

The mild hybrid vehicle can assist the engine torque according to driving conditions using the MHSG and can charge the battery (for example, a 48 V battery) through regenerative braking. As a result, fuel efficiency of the mild hybrid vehicle can be improved.

The mild hybrid vehicle has a power electronics (PE) device including a mild hybrid starter & generator, a hybrid electric power control unit, and a hydraulic pump control unit. This power electronics device must be cooled through a power electronics cooling circuit, separate from the engine cooling circuit for cooling the engine.

The engine cooling circuit and the power electronics cooling circuit are provided with a coolant passage, a radiator and a coolant pump, respectively, and perform integrated cooling or individual cooling through opening and closing of a three-way valve.

However, there is a limitation in increasing the size of each coolant passage based on the engine coolant flow rate by connecting the respective radiators in series while the coolant capacities required for the engine cooling circuit and the power electronics cooling circuit are different. In addition, considering the temperature limiting factor in the power electronics device, if high temperature engine coolant is supplied to the power electronics device, there is a risk of damage to the power electronics device components. Further, there is a problem in that, in the case of separate cooling from the integration, an additional power electronics device cooling circuit must be operated through a separate coolant pump to cool the high temperature coolant remaining in the power electronics device.

The above information disclosed in this Background section is only for enhancement of understanding of the background of the disclosure, and therefore, it may contain information that does not form the prior art that is already known in this country to a person of ordinary skill in the art.

SUMMARY

The present disclosure has been made in an effort to provide an engine cooling system for a vehicle in which the engine coolant and power electronics coolant are separated and optimized for each system flow rate and high-temperature engine coolant remaining in the power electronics device is minimized.

An engine cooling system for a vehicle according to an exemplary embodiment of the present disclosure includes: an engine system including an engine having a plurality of combustion chambers that generate a driving force by combustion of fuel, a power electronics (PE) device that assists the engine torque of the engine system in accordance with the driving state of the vehicle, a main radiator connected to the engine system by an engine coolant line and discharging heat generated in the engine system by engine coolant flowing in the engine coolant line, a sub-radiator connected to the PE device through a PE coolant line and discharging heat generated in the PE device by PE coolant flowing in the PE coolant line; a 2-way valve connecting the engine coolant line and the PE coolant line to each other and being opened or closed, wherein the 2-way valve is configured to be opened or closed to allow the engine coolant flows through or to block the engine coolant, and a controller for controlling the opening and closing of the 2-way valve according to a temperature of the engine coolant and a vehicle driving condition.

The engine system may further include an exhaust gas recirculation (EGR) device that a part of the exhaust gas discharged from the engine is inputted and the exhaust gas is supplied again to the engine.

The EGR device may include an EGR cooler for cooling the exhaust gas flowing into the EGR device.

The PE device may include an electric water pump (EWP) for pumping the PE coolant to circulate the PE cooling circuit.

The PE device may include a hybrid starter & generator (HSG) that starts the engine or generates power by the output of the engine.

The main radiator and the sub-radiator may be connected in parallel.

The main radiator and the sub-radiator may be integrally formed.

The engine cooling system for a vehicle according to an exemplary embodiment of the present disclosure may further include a chiller provided at a position adjacent to the main radiator and the sub-radiator, constituting an air conditioner, and cooling the refrigerant compressed at high temperature and high pressure in the compressor.

The engine cooling system for a vehicle according to an exemplary embodiment of the present disclosure may further include a cooling fan disposed at a position facing the chiller in a state that the main radiator and the sub-radiator are disposed between the cooling fan and the chiller.

The main radiator and the sub-radiator may be provided at both sides thereof with a region separating plate for separating regions of the main radiator and the sub-radiator.

The 2-way valve is installed in the region separating plate, and the circulation path of the engine coolant may be changed according to opening and closing of the 2-way valve.

The 2-way valve may include a first 2-way valve and a second 2-way valve provided at both sides of the abutment of the main radiator and the sub-radiator.

The controller determines whether the temperature of the engine coolant is equal to or higher than the first temperature, and may control so that the first and second 2-way valves are closed, thereby the engine coolant is circulated through the engine cooling circuit and the PE coolant is circulated through the PE cooling circuit when the temperature of the engine coolant is lower than the first temperature.

The controller may control so that the first and second 2-way valves are opened, thereby the engine coolant and the PE coolant is mixed to be circulated through the engine cooling circuit and the PE cooling circuit simultaneously when the temperature of the engine coolant is equal to or higher than the first temperature.

The controller may control so that any one of the first and second 2-way valves is opened, thereby the engine coolant and the PE coolant is mixed to be circulated through the engine cooling circuit and the PE cooling circuit simultaneously when the temperature of the PE device needs to be raised at a cold start of the vehicle.

The first temperature may be between 90° C. and 120° C.

According to the exemplary embodiment of the present disclosure, the engine coolant can be selectively injected into the sub-radiator according to the coolant temperature condition during the vehicle operation condition, therefore it is possible to maximize the cooling efficiency of the engine as the engine coolant and the outside air temperature can be transferred at a high temperature difference in the main radiator and the sub-radiator.

In addition, the addition of the region separating plate and the 2-way valve in the existing radiator can reduce the investment cost because one radiator can simultaneously perform engine cooling and PE cooling.

In addition, when the engine coolant is used in the sub-radiator, the electric water pump in the PE device can be disabled, thereby improving the fuel efficiency.

In addition, since the main radiator and the sub-radiator are integrally formed, the assemblability is improved, which is advantageous for commonization and standardization of grade/type of the vehicle.

In addition, by simplifying the layout of the vehicle, it is advantageous in securing an effective area of the front cooling system of the vehicle and securing occupant space.

In addition, in electric vehicle (EV) mode, coolant of the engine system can be used as a heat source to shorten the warm-up time of the high-voltage battery of the PE device, and it is possible to improve fuel efficiency when the EV mode is extended in a low temperature environment.

DETAILED DESCRIPTION OF THE EMBODIMENTS

Figure 1:
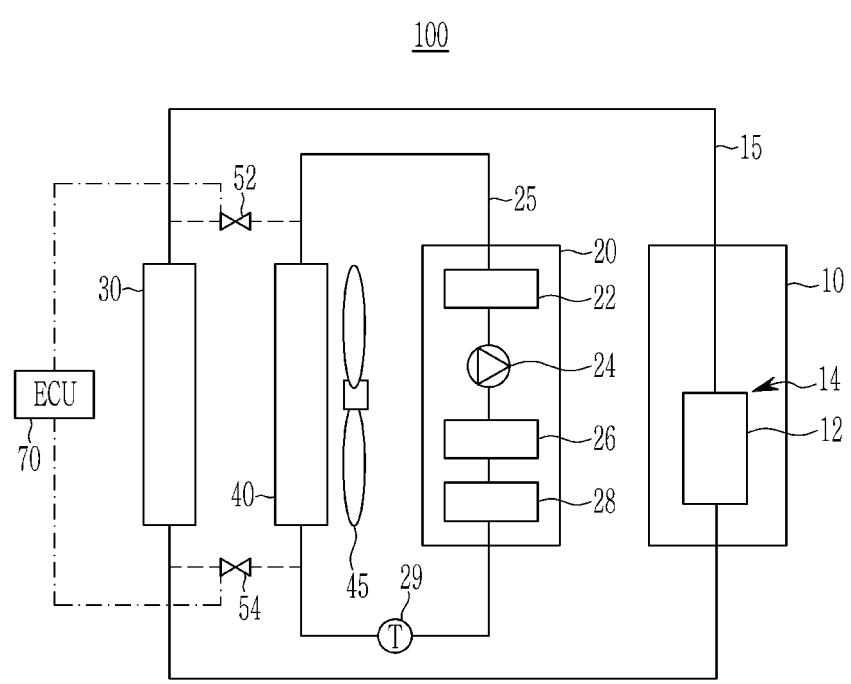
FIG. 1 is a conceptual diagram schematically showing an engine cooling system for a vehicle according to an exemplary embodiment of the present disclosure.

Hereinafter, the present disclosure will be described more fully with reference to the accompanying drawings, in which exemplary embodiments of the disclosure are shown. As those skilled in the art would realize, the described embodiments may be modified in various different ways, all without departing from the spirit or scope of the present disclosure.

Further, in exemplary embodiments, since like reference numerals designate like elements having the same configuration, a first exemplary embodiment is representatively described, and in other exemplary embodiments, only configurations different from the first exemplary embodiment will be described.

The drawings are schematic, and are not illustrated in accordance with a scale. Relative dimensions and ratios of portions in the drawings are illustrated to be exaggerated or reduced in size for clarity and convenience, and the dimensions are just exemplified and are not limiting. In addition, same structures, elements, or components illustrated in two or more drawings use same reference numerals for showing similar features. It will be understood that when an element such as a layer, film, region, or substrate is referred to as being "on" another element, it can be directly on the other element or intervening elements may also be present.

The exemplary embodiment of the present disclosure shows an exemplary embodiment of the present disclosure in detail. As a result, various modifications of the drawings will be expected. Therefore, the exemplary embodiment is not limited to a specific aspect of the illustrated region, and for example, includes modifications of an aspect by manufacturing.

Now, an engine cooling system according to an exemplary embodiment of the present disclosure will be described with reference to FIGS. 1 and 4.

Figure 2:
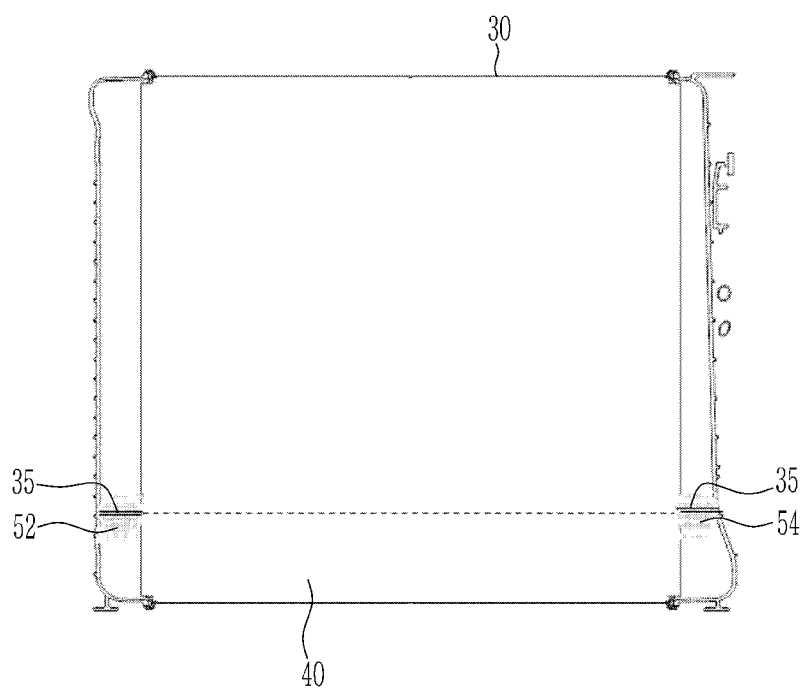
FIG. 2 is a view schematically showing a main radiator and a sub-radiator according to an exemplary embodiment of the present disclosure.
Figure 3:
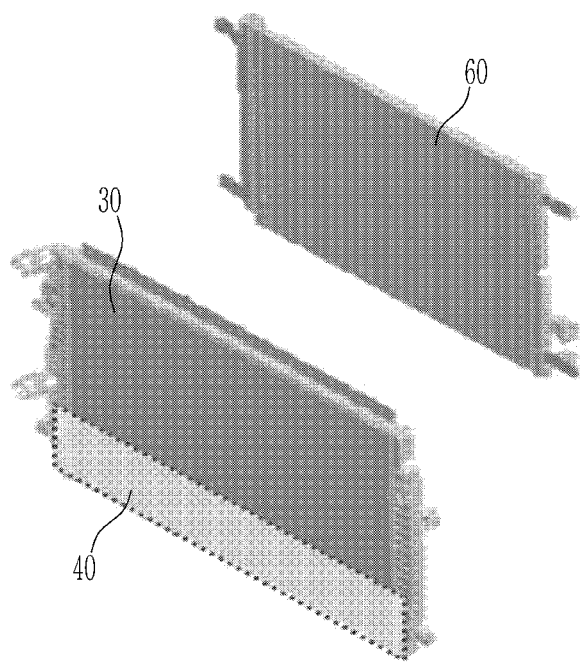
FIG. 3 is a view schematically showing an integrated radiator and a chiller according to an exemplary embodiment of the present disclosure.
Figure 4:
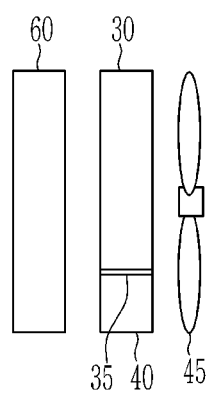
FIG. 4 is a conceptual view schematically showing an integrated radiator, a chiller, and a cooling fan according to an exemplary embodiment of the present disclosure.

FIG. 1 is a conceptual diagram schematically showing an engine cooling system for a vehicle according to an exemplary embodiment of the present disclosure, FIG. 2 is a view schematically showing a main radiator and a sub-radiator according to an exemplary embodiment of the present disclosure, FIG. 3 is a view schematically showing an integrated radiator and a chiller according to an exemplary embodiment of the present disclosure, and FIG. 4 is a conceptual view schematically showing an integrated radiator, a chiller, and a cooling fan according to an exemplary embodiment of the present disclosure.

Referring to FIG. 1, the vehicle engine cooling system 100 includes an engine system 10, a power electronics (PE) device 20, a main radiator 30, a sub-radiator 40, 2-way valves 52 and 54, and a controller 70.

In the present disclosure, the controller 70 may be an electronic control unit (ECU).

The engine system 10 includes an engine, and the engine includes a plurality of combustion chambers that generate a driving force by combustion of fuel. The engine is provided with an intake line through which an intake gas (outside air) supplied to the combustion chamber flows and an exhaust line through which exhaust gas discharged from the combustion chamber flows.

An intake manifold for distributing the intake gas to a plurality of combustion chambers is mounted at an outlet of the intake line. An exhaust manifold for collecting exhaust gas discharged from a plurality of combustion chambers into an exhaust line is mounted at an inlet of the exhaust line.

The intake gas supplied to the combustion chamber of the engine is supplied to the combustion chamber of the engine through the intake line and the intake manifold and the exhaust gas supplied from the combustion chamber is exhausted to the outside through the exhaust manifold and the exhaust line. At this time, the exhaust line is provided with an exhaust gas purifying device for purifying the exhaust gas.

The engine system 10 may further include an exhaust gas recirculation (EGR) device 14 that a part of the exhaust gas discharged from the engine is inputted and the exhaust gas is supplied again to the engine, and the EGR device 14 may include an EGR cooler 12 for cooling the exhaust gas flowing into the EGR device 14.

An EGR device 14 realized by the EGR line supplies a portion of the exhaust gas to the intake system and inflows to combustion chamber when exhaust amount of the nitrogen oxide needs to be reduced according to driving condition. Then, the exhaust gas that is inert gas which volume is not changed depresses density of the air/fuel mixture and flame transmitting speed is reduced during combustion of the fuel. Therefore, combustion velocity of the fuel is reduced and raise of the combustion temperature is reduced to depress generation of the nitrogen oxide.

The PE device 20 assists the engine torque of the engine system 10 in accordance with the driving state of the vehicle. The PE device 20 may include a hybrid starter & generator (HSG) that starts the engine or generates power by the output of the engine.

Further, the PE device 20 may include an integrated starter generator, and an electric water pump (EWP) 24 for pumping the PE coolant circulating the PE device 20 to circulate the PE cooling circuit. The EWP 24 provides pressure to cause PE coolant to circulate through sub-radiator 40 through the PE device 20.

Further, the PE device 20 may include a hybrid electric power control unit (HPCU) 26 as an integrated controller applied to the hybrid vehicle, an electric oil pump for pumping oil used in the PE device 20, and an oil pump control unit 28 for controlling the oil pump, and the like.

The main radiator 30 is connected to the engine system 10 by an engine coolant line 15 to form an engine cooling circuit. Further, The main radiator 30 discharges heat generated in the engine system by engine coolant flowing in the engine coolant line.

The engine cooling circuit is provided with an engine coolant pump, which can provide the pressure for the engine coolant to circulate through the engine coolant line.

Heat generated in the engine system 10 is transferred to engine coolant water, and the engine coolant is sent to the thin tubes in the main radiator 30 and cooled by the wind (traveling wind) generated during traveling and a cooling fan 45 mounted near the main body of the radiator 30. Then, the cooled engine coolant is sent again to the engine system 10 and receives the heat of the engine system 10.

The sub-radiator 40 is connected to the PE device 20 through a PE coolant line 25 to form a PE cooling circuit. Further, the sub-radiator 40 discharges heat generated in the PE device 20 by PE coolant flowing in the PE coolant line 25.

The main radiator 30 and the sub-radiator 40 may be connected in parallel or may be integrally formed.

A chiller 60 may be further provided at a position adjacent to the main radiator 30 and the sub-radiator 40 formed integrally with each other. The chiller 60 is a separate cooling device that cools the engine coolant and the PE coolant by exchanging heat with the air-conditioning gas. The low-temperature air-conditioning gas absorbs heat through heat exchange with the engine coolant and the PE coolant, and the heat stored in the air-conditioning gas is discharged to the outside of the vehicle by utilizing the air-conditioner cooling system. The chiller 60 as a separate cooling device assists the heat exchange between the main radiator 30 and the sub-radiator 40 and functions as an additional cooling device when supercooling of the engine coolant and the PE coolant is required.

Further, the cooling fan 45 may further be provided at a position facing the chiller 60 in a state that the main radiator 30 and the sub-radiator 40 are disposed between the cooling fan 45 and the chiller 60. The cooling fan 45 may be mounted on the main body of the main radiator 30. The cooling fan 45 may be an electric cooling fan. When a water temperature sensor 29 detects the temperature of the coolant at a temperature higher than a predetermined temperature even if the vehicle is switched off, the thermostat is opened mechanically and the electric cooling fan can be automatically turned to cool the radiator.

A region separating plate 35 may be provided on both sides of the main radiator 30 and the sub-radiator 40 which are integrally formed with each other. That is, as shown in FIGS. 2 and 4, the region separating plate 35 for separating the areas of the main radiator 30 and the sub-radiator 40 may be provided on both sides of the main radiator 30 and the sub radiator 40, that is, on both the lower ends of the main radiator 30 and the both upper ends of the sub-radiator 40.

The 2-way valves 52 and 54 connect the engine coolant line 15 and the PE coolant line 25 to each other and are opened or closed so that the engine coolant flows through or is blocked from the PE coolant line 25.

The 2-way valves 52 and 54 may be 2-way solenoid valves. The solenoid valve can automatically open and close the valve using the electromagnetic force of the electromagnetic coil. The solenoid valve can be opened and closed by the magnetic field force when the electricity is energized by winding the wire in a spiral form.

Further, instead of the 2-way valves 52 and 54, wax-type thermostats or electronic thermostats can be used.

The wax-type thermostat is a structure in which wax is sealed in a metal case, a plunger is provided in the center of the case, and the wax-type thermostat is fixed to the main body. The plunger is fixed to the main body, and the case containing the wax is capable of reciprocating motion on the plunger.

In the case of the wax-type thermostat, when the temperature of the coolant rises to about 80° C., when the wax starts to melt and the volume increases while the wax melts, the wax case is pushed out of the plunger and eventually the valve is opened. When the valve is opened, hot engine coolant flows into the radiator and is cooled. When the coolant temperature drops, the spring pushes the wax case back to its original position on the plunger. This closes the valve completely and the coolant does not circulate to the radiator.

The electronic thermostat is a type in which a heating element is embedded in a wax case. Depending on the operating conditions of the engine, the controller 70 supplies current to the heating element to electrically heat the wax in addition to the heat of the coolant.

The 2-way valves 52 and 54 are provided in the region dividing plate 35 so that the circulation path of the engine coolant can be changed by opening and closing the 2-way valves 52 and 54. The 2-way valves 52 and 54 may include a first 2-way valve 52 and a second 2-way valve 54 provided at both sides of the abutment of the main radiator 30 and the sub-radiator 40.

Figure 5:
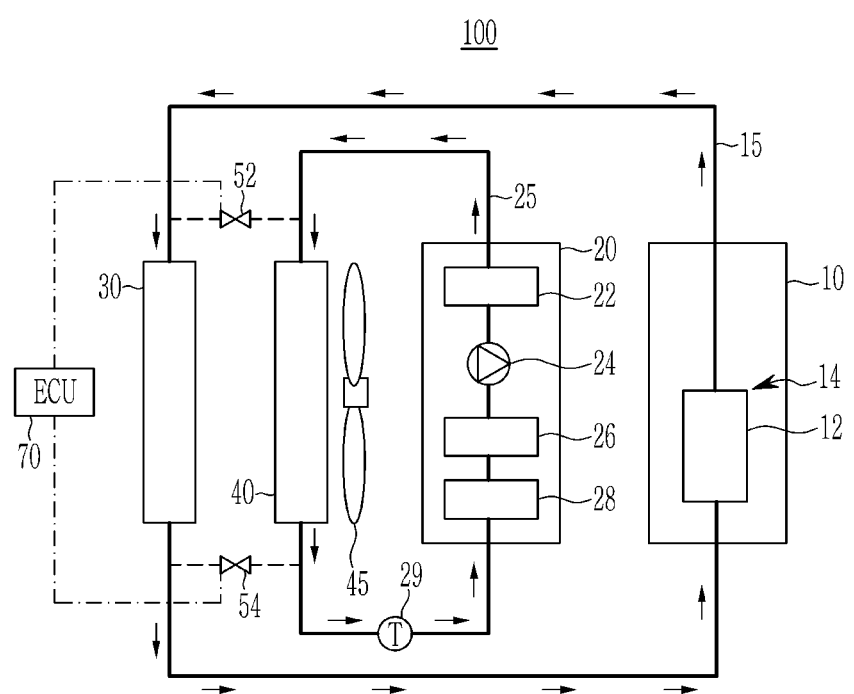
FIG. 5 is a conceptual view schematically showing the flow of coolant in the case of the normal traveling mode in the engine cooling system for a vehicle according to an exemplary embodiment of the present disclosure.
Figure 6:
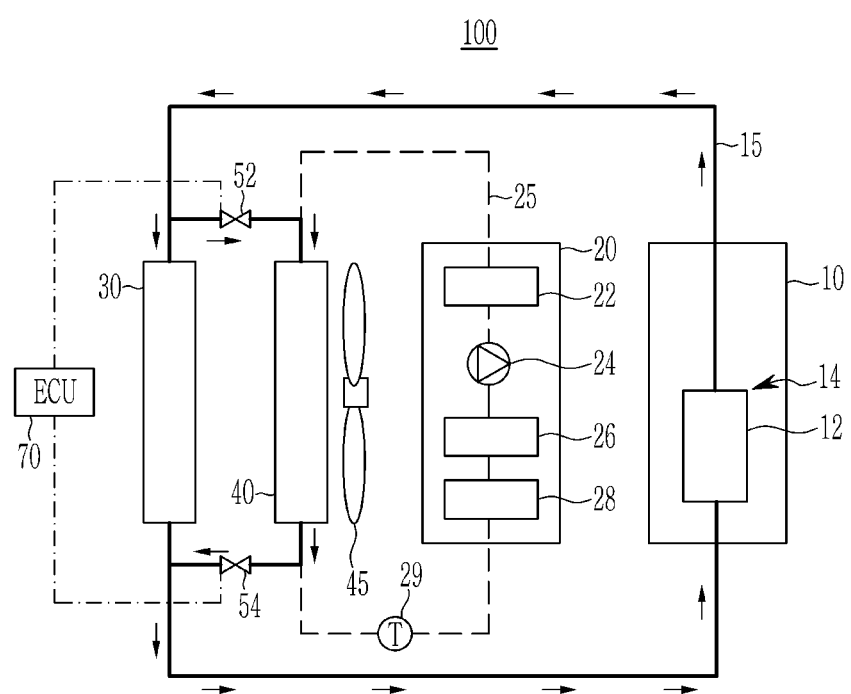
FIG. 6 is a conceptual diagram schematically showing the flow of coolant in the case of the harsh traveling mode in the engine cooling system for a vehicle according to an exemplary embodiment of the present disclosure.
Figure 7:
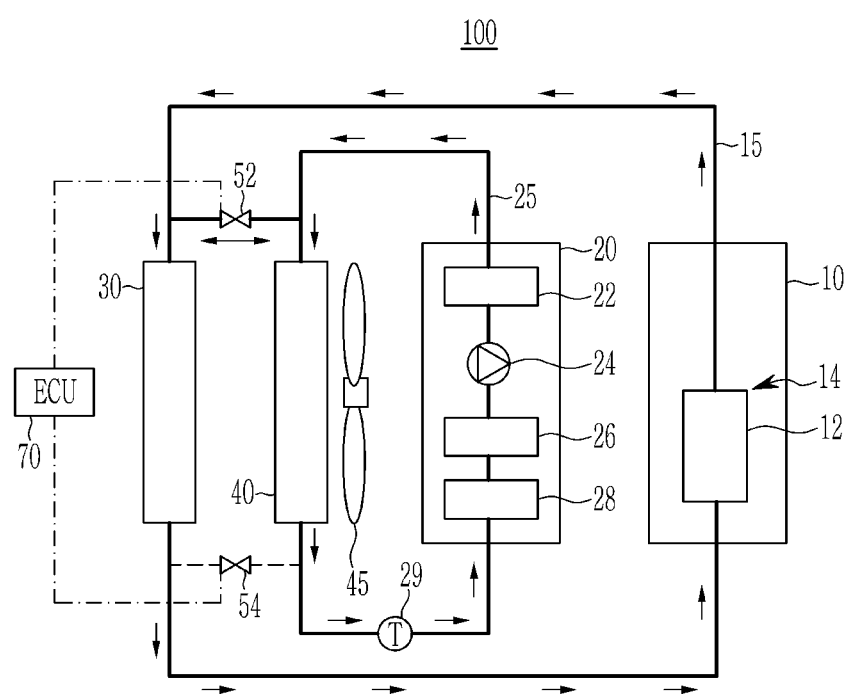
FIG. 7 is a conceptual diagram schematically showing the flow of coolant when the temperature of the PE device needs to be raised at the time of cold start of the vehicle in the engine cooling system for a vehicle according to an exemplary embodiment of the present disclosure.

FIG. 5 is a conceptual view schematically showing the flow of coolant in the case of the normal traveling mode in the engine cooling system for a vehicle according to an exemplary embodiment of the present disclosure, FIG. 6 is a conceptual diagram schematically showing the flow of coolant in the case of the harsh traveling mode in the engine cooling system for a vehicle according to an exemplary embodiment of the present disclosure, and FIG. 7 is a conceptual diagram schematically showing the flow of coolant when the temperature of the PE device needs to be raised at the time of cold start of the vehicle in the engine cooling system for a vehicle according to an exemplary embodiment of the present disclosure.

Referring to FIG. 5, the controller 70 determines whether the temperature of the engine coolant is equal to or higher than the first temperature. The temperature of the engine coolant can be measured by a coolant sensor installed in the engine coolant line 15. Further, the temperature of the PE coolant or the coolant temperature in which the engine coolant and PE coolant are mixed can be measured by the water temperature sensor 29 installed in the PE coolant line 25.

When the temperature of the engine coolant is lower than the first temperature, that is, in the normal running mode, the controller 70 controls the first 2-way valve 52 and the second 2-way valve 54 to be closed. At this time, the first temperature may be from about 90° C. to about 120° C.

When the first 2-way valve 52 and the second 2-way valve 54 are closed, the engine coolant circulates the engine cooling circuit, and the PE coolant circulates through the PE cooling circuit. At this time, in order to pump the PE coolant to circulate the PE cooling circuit, the electric water pump 24 is operated. The engine coolant heated in the engine system 10 is cooled through the main radiator 30 and then flows into the engine system 10 again.

Referring to FIG. 6, when the temperature of the engine coolant is equal to or higher than the first temperature, the controller 70 controls the first 2-way valve 52 and the second 2-way valve 54 to be opened. When the temperature of the engine coolant is equal to or higher than the first temperature, the engine is in the harsh running mode. The harsh driving mode can be, for example, a high-speed, high-temperature environment in which the engine may overheat, a traveling mode such as when towing the vehicle.

When the first 2-way valve 52 and the second 2-way valve 54 are opened, the engine coolant circulates through the engine cooling circuit and flows to the sub-radiator 40 through the first 2-way valve 52 and the second 2-way valve 54. The engine coolant heated in the engine system 10 is cooled through the main radiator 30 and the sub-radiator 40 and flows into the engine system 10 again. At this time, the electric water pump 24 of the PE device 20 does not operate.

Referring to FIG. 7, when the temperature of the PE device 20 needs to be raised at the time of low-temperature start of the vehicle, the controller 70 controls to open any one of the first 2-way valve 52 and the second 2-way valve 54. The PE coolant temperature of the PE device 20 can be measured by the water temperature sensor 29. At this time, the engine coolant and the PE coolant are mixed and circulated simultaneously to the engine cooling circuit and the PE cooling circuit. The relatively high temperature engine coolant flowing in the engine cooling circuit is sent to the PE cooling circuit and the high temperature coolant contained in the engine coolant warms the PE device 20.

Like this, according to an exemplary embodiment of the present disclosure, the engine coolant can be selectively injected into the sub-radiator according to the coolant temperature condition during the vehicle operation condition, therefore it is possible to maximize the cooling efficiency of the engine as the engine coolant and the outside air temperature can be transferred at a high temperature difference in the main radiator and the sub-radiator.

In addition, the addition of the region separating plate and the 2-way valve in the existing radiator can reduce the investment cost because one radiator can simultaneously perform engine cooling and PE cooling.

In addition, when the engine coolant is used in the sub-radiator, the electric water pump in the PE device can be disabled, thereby improving the fuel efficiency.

In addition, since the main radiator and the sub-radiator are integrally formed, the assemblability is improved, which is advantageous for standardization.

In addition, by simplifying the layout of the vehicle, it is advantageous in securing an effective area of the front cooling system of the vehicle and securing occupant space.

In addition, in an electric vehicle (EV) mode, coolant of the engine system can be used as a heat source to shorten the warm-up time of the high-voltage battery of the PE device, and it is possible to improve fuel efficiency when the EV mode is extended in a low temperature environment.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. An engine cooling system for a vehicle, comprising:
an engine system including an engine having a plurality of combustion chambers that generate a driving force by combustion of fuel;
a power electronics (PE) device that assists engine torque of the engine system in accordance with a driving state of the vehicle;
a main radiator connected to the engine system by an engine coolant line and discharging heat generated in the engine system by engine coolant flowing in the engine coolant line;
a sub-radiator connected to the PE device through a PE coolant line and discharging heat generated in the PE device by PE coolant flowing in the PE coolant line;
a 2-way valve connecting the engine coolant line and the PE coolant line to each other, wherein the 2-way valve is configured to be opened or closed to allow the engine coolant flows through or to block the engine coolant from the PE coolant line;

a chiller at a position adjacent to the main radiator and the sub-radiator;

a cooling fan disposed at a position facing the chiller in a state that the main radiator and the sub-radiator are disposed between the cooling fan and the chiller; and a controller for controlling the opening and closing of the 2-way valve according to a temperature of the engine coolant and a vehicle driving condition, wherein the main radiator and the sub-radiator are connected in parallel, wherein the main radiator and the sub-radiator are integrally combined, and wherein the chiller includes an air conditioner and cools the engine coolant and the PE coolant by exchanging heat with air-conditioning gas.

2. The engine cooling system of claim 1, wherein the engine system further includes an exhaust gas recirculation (EGR) device for recirculating a portion of exhaust gas discharged from the engine into the engine.

3. The engine cooling system of claim 2, wherein the EGR device includes an EGR cooler for cooling the exhaust gas flowing into the EGR device.

4. The engine cooling system of claim 1, wherein the PE device includes an electric water pump for pumping the PE coolant to circulate inside the PE cooling line.

5. The engine cooling system of claim 1, wherein the PE device includes a hybrid starter & generator that starts the engine or generates power by an output of the engine.

6. The engine cooling system of claim 1, wherein each of the main radiator and the sub-radiator includes a region separating plate at both sides of each of the main radiator and the sub-radiator for separating the main radiator and the sub-radiator.

7. The engine cooling system of claim 6, wherein the 2-way valve is disposed on the region separating plate, and a flowing direction of the engine coolant is changed according to opening and closing of the 2-way valve.

8. The engine cooling system of claim 7, wherein the 2-way valve includes a first 2-way valve at one side of each of the main radiator and the sub-radiator and a second 2-way valve at another side of each of the main radiator and the sub-radiator.

9. The engine cooling system of claim 8, wherein the controller determines whether the temperature of the engine coolant is equal to or higher than a reference temperature, and wherein the controller controls the first and second 2-way valves to be closed to circulate the engine coolant through the engine cooling line and to circulate the PE coolant through the PE cooling line when the temperature of the engine coolant is lower than the reference temperature.

10. The engine cooling system of claim 9, wherein the controller controls the first and second 2-way valves to be open to mix and circulate the engine coolant and the PE coolant through the engine cooling line and the PE cooling line simultaneously when the temperature of the engine coolant is equal to or higher than the reference temperature.

11. The engine cooling system of claim 8, wherein the controller controls any one of the first and second 2-way valves to be opened to mix and circulate the engine coolant and the PE coolant through the engine cooling line and the PE cooling line simultaneously to raise the temperature of the PE device at a cold start of the vehicle.

12. The engine cooling system of claim 9, wherein the reference temperature is between 90° C. and 120° C.

* * * * *